(12) United States Patent
Stienhans et al.

(10) Patent No.: US 7,606,820 B2
(45) Date of Patent: Oct. 20, 2009

(54) DETECTING AND HANDLING CHANGES TO BACK-END SYSTEMS

(75) Inventors: Frank Stienhans, San Carlos, CA (US); Thomas Fiedler, Pfinztal (DE); Jutta Bindewald, Angelbachtal (DE); Georg Wilhelm, Kronau (DE); Martin Hartig, Speyer (DE); Felix Wente, Heidelberg (DE); Reiner P. Hammerich, Rauenberg (DE); Frank E. Seeger, Wiesloch (DE)

(73) Assignee: SAP AG, Walldorf (DE)

( * ) Notice: Subject to any disclaimer, the term of this patent is extended or adjusted under 35 U.S.C. 154(b) by 762 days.

(21) Appl. No.: 10/843,009

(22) Filed: May 11, 2004

(65) Prior Publication Data

US 2005/0267913 A1    Dec. 1, 2005

(51) Int. Cl.
*G06F 17/00* (2006.01)
(52) U.S. Cl. .................. 707/102; 717/105; 717/120
(58) Field of Classification Search .................. None
See application file for complete search history.

(56) References Cited

U.S. PATENT DOCUMENTS

| | | | |
|---|---|---|---|
| 5,923,877 A * | 7/1999 | Berner et al. ............... 717/108 |
| 6,564,232 B1 * | 5/2003 | Cole et al. ................... 707/203 |
| 6,735,766 B1 * | 5/2004 | Chamberlain et al. ........ 717/173 |
| 2002/0199025 A1 * | 12/2002 | Kutay et al. .................. 709/250 |
| 2003/0130984 A1 * | 7/2003 | Quinlan et al. .................. 707/1 |
| 2004/0044754 A1 * | 3/2004 | Virdy et al. .................. 709/223 |
| 2005/0050537 A1 * | 3/2005 | Thompson et al. ........... 717/165 |
| 2006/0111983 A1 * | 5/2006 | Malison ........................ 705/26 |
| 2007/0180432 A1 * | 8/2007 | Gassner et al. ............... 717/136 |

* cited by examiner

*Primary Examiner*—Tim T. Vo
*Assistant Examiner*—Jau-Shya Meng
(74) *Attorney, Agent, or Firm*—Finnegan, Henderson, Farabow, Garrett & Dunner LLP

(57) ABSTRACT

The description includes methods and apparatus, including computer program products, for detecting and handling changes to back-end systems. Configuration data for a pattern is received. The pattern includes a predefined arrangement of user interface elements and specifies predefined actions that can be performed using the user interface elements. The configuration data includes a first version identification and specifies associations between one or more of the user interface elements and one or more entities in a back-end system. The back-end system is accessed and a second version identification is obtained. If the first version identification does not match the second version identification, the configuration data is modified based on information about the back-end system.

26 Claims, 7 Drawing Sheets

FIG. 1

DETECTING AND HANDLING CHANGES TO BACK-END SYSTEMS

BACKGROUND

The description relates to data processing by a computing device, and more particularly to detecting and handling changes to back-end systems.

A user interface (UI) facilitates interaction between humans and computers by inviting and responding to user input. User interfaces come in many varieties, and are designed to work in concert with application programs. Application programs, sometimes referred to simply as applications, are programs that an end-user runs to accomplish certain tasks. Applications typically work in conjunction with one or more back-end systems, which store the data to be worked on (e.g., business objects and other business data), as well as logic for manipulating the data (e.g., transactions or other business logic). Examples of back-end systems include database systems, enterprise resource planning (ERP) systems, and customer relationship management (CRM) systems.

A common scenario involving user interfaces is a network application, where a network connects an application program running on a server and one or more user interfaces displayed in client programs running on client devices. The client/server relationship is one in which a server provides services to the client devices. Both the client devices and the server typically have a network interface for accessing networks such as a local area network (LAN), a wide area network (WAN), or the Internet.

In a network environment, a common client device is a personal computer, and a common client program is a Web browser. The client program, which displays a user interface for an application running on a server, enables networked communication between the client device and the server using a data transfer protocol, e.g., the Hypertext Transfer Protocol (HTTP), to exchange files, images, programs, or application data. HTTP is a request/response-type protocol that specifies how the client device and the server communicate with each other. The server may receive a request from the client device using HTTP, respond to the request, and then close the connection. HTTP is a stateless protocol, meaning that each time a client device requests a Web page, the server will respond to the request independently of any previous requests from the client device, and without recording the request.

The information transmitted from the server and intended for display in the client program on the client device may be marked up with Hypertext Markup Language (HTML) code or Extensible Markup Language (XML) code. HTML is a language that is used to describe the structure of a document, such as a Web page. Client programs interpret HTML code to determine how to display the information contained in the page. A user may request a Web page from a server by clicking on a hyperlink or specifying a Uniform Resource Locator (URL) string. A URL can be used to identify the address of a file or Web page that may be accessed on a network. The address identifies the Web server on which the file is stored and the directory in which the file is located. When the server receiving the URL request finds the sought Web page, the server sends the page to the client device so that the client device can use that Web page, for example, by generating a display for a user according to the Web page.

An application usually implements the functionality required to display and execute one or more user interfaces for the application. For this reason, an application is sometimes referred to as a user interface application. In some cases, part of the user interface functionality (e.g., rendering) may be handled by a client program that interacts with the application. Whether or not this can occur depends on the capabilities of the client program.

SUMMARY OF THE INVENTION

The description describes methods and apparatus, including computer program products, for developing user interface applications using configurable patterns.

In general, in one aspect there is a computer program product, tangibly embodied in an information carrier. The computer program product includes instructions operable to cause data processing apparatus to receive configuration data for a pattern, where the pattern includes a predefined arrangement of user interface elements and specifies predefined actions that can be performed using the user interface elements. The configuration data includes a first version identification and specifies associations between one or more of the user interface elements and one or more entities in a back-end system. The computer program product also includes instructions operable to cause data processing apparatus to access the back-end system and obtain a second version identification, and, if the first version identification does not match the second version identification, modify the configuration data based on information about the back-end system.

In another aspect, there is a computer program product, tangibly embodied in an information carrier. The computer program product includes instructions operable to cause data processing apparatus to receive a specification of a configuration application corresponding to a pattern. The pattern includes a predefined arrangement of user interface elements and specifies predefined actions that can be performed using the user interface elements. The configuration application comprises a first version identification, and is operable to enable a user to specify associations between one or more of the user interface elements and one or more entities in a back-end system. The computer program product also includes instructions operable to cause data processing apparatus to access the back-end system and obtain a second version identification, and, if the first version identification does not match the second version identification, modify the configuration application based on information about the back-end system.

Other examples of either of the computer program products above can include one or more of the following features. The first version identification and the second version identification can each correspond to a version of the back-end system. The first version identification and the second version identification can each correspond to a version of a specific entity in the back-end system. The instructions to obtain the second version identification do not have to be executed until an application corresponding to the configuration data accesses the specific entity in the back-end system. The instructions to access the back-end system and to modify the configuration data can be executed when an application corresponding to the configuration data is first launched.

The instructions to modify the configuration data can include instructions to disregard an added entity in the back-end system. The added entity can include an added field. The instructions to modify the configuration data can include instructions to disregard a deleted entity not included in the back-end system but referenced in the configuration data. The deleted entity can include a deleted field.

The instructions to modify the configuration data can include instructions to disable functionality associated with a deleted entity not included in the back-end system but referenced in the configuration data. The functionality can include displaying data associated with the deleted entity. The functionality can include invoking one of the predefined actions in association with the deleted entity. The instructions can be further operable to cause the data processing apparatus to display a notification message related to the deleted entity. The instructions to modify the configuration data can include instructions to modify one or more of the user interface elements that are associated with a modified entity in the back-end system. The information about the back-end system can include a data type associated with the modified entity.

The instructions to modify the configuration data can include instructions to enable a user to specify whether to save the configuration data. The information about the back-end system can include a flag. The instructions to modify the configuration data can include instructions to display an added entity in the back-end system that is associated with the flag. The instructions to modify the configuration data can include instructions to highlight a modified entity in the back-end system that is associated with the flag. The instructions to modify the configuration data can include instructions to terminate execution of an application if the flag is associated with a deleted entity not included in the back-end system but referenced in the configuration data. The instructions to modify the configuration data can include instructions to persist the modified configuration data in a configuration file associated with the configuration file.

The pattern can be a first pattern and the instructions can be further operable to cause the data processing apparatus to establish an integrated development environment for developing applications based on a programming model and establish a plurality of patterns including the first pattern, each pattern including a predefined arrangement of user interface elements and specifying predefined actions that can be performed using the user interface elements, and each pattern having an associated configuration application and an associated pattern component. Each configuration application and each pattern component can be developed using the integrated development environment and conforms to the programming model. The instructions can be further operable to cause the data processing apparatus to develop an application by executing the configuration application for the first pattern to produce configuration data for the first pattern, where the configuration data specifies associations between one or more of the user interface elements and one or more entities in the back-end system, and further specifying customization data for the user interface elements. The integrated development environment (IDE) can include IDEs that are built using the open Eclipse Platform supported by the Eclipse Foundation (e.g., the Web Dynpro IDE developed by SAP, or the WebSphere Studio IDE developed by IBM Corp. of Armonk, N.Y.), as well as proprietary IDEs (e.g., the Visual Studio .NET IDE developed by Microsoft Corp. of Redmond, Wash.). The instructions can be further operable to cause the data processing apparatus to establish one or more run-time services operable to be used by applications developed according to the programming model. The pattern component can invoke one or more of the run-time services during execution of the application. The run-time services can include a Web Dynpro runtime, virtual machines (e.g., the Java Virtual Machine), and the Common Language Runtime (a run-time system developed by Microsoft Corp.). The run-time systems can be hosted in multiple environments, including servers such as a J2EE-compliant server, such as the Web Application Server from SAP, or the WebSphere Application Server from IBM Corp.

In another aspect, there is a method. The method includes receiving configuration data for a pattern. The pattern includes a predefined arrangement of user interface elements and specifies predefined actions that can be performed using the user interface elements. The configuration data includes a first version identification and specifies associations between one or more of the user interface elements and one or more entities in a back-end system. The method also includes accessing the back-end system and obtaining a second version identification, and, if the first version identification does not match the second version identification, modifying the configuration data based on information about the back-end system.

Other examples can include one or more of the following features. The first version identification and the second version identification can each correspond to a version of the back-end system. The first version identification and the second version identification can each correspond to a version of a specific entity in the back-end system. Obtaining the second version identification does not have to be executed until an application corresponding to the configuration data accesses the specific entity in the back-end system. Accessing the back-end system and modifying the configuration data can be executed when an application corresponding to the configuration data is first launched.

The method can include disregarding an added entity in the back-end system. The added entity can include an added field. The method can include instructions to disregard a deleted entity not included in the back-end system but referenced in the configuration data. The deleted entity can include a deleted field.

The method can include disabling functionality associated with a deleted entity not included in the back-end system but referenced in the configuration data. The functionality can include displaying data associated with the deleted entity. The functionality can include invoking one of the predefined actions in association with the deleted entity. The method can include displaying a notification message related to the deleted entity. The method can include modifying one or more of the user interface elements that are associated with a modified entity in the back-end system. The information about the back-end system can include a data type associated with the modified entity.

The method can include enabling a user to specify whether to save the configuration data. The information about the back-end system can include a flag. The method can include displaying an added entity in the back-end system that is associated with the flag. The method can include highlighting a modified entity in the back-end system that is associated with the flag. The method can include terminating execution of an application if the flag is associated with a deleted entity not included in the back-end system but referenced in the configuration data. The method can include persisting the modified configuration data in a configuration file associated with the configuration file.

The pattern can be a first pattern and the method can include establishing an integrated development environment for developing applications based on a programming model and establishing a plurality of patterns including the first pattern, where each pattern includes a predefined arrangement of user interface elements and specifies predefined actions that can be performed using the user interface elements. Each pattern can have an associated configuration application and an associated pattern component. Each configuration application and each pattern component can be developed using the integrated development environment and conforms to the programming model. The method can also include developing an application by executing the configuration application for the first pattern to produce configuration data for the first pattern, where the configuration data specifies associations between one or more of the user interface elements and one or more entities in the back-end system, and further specifying customization data for the user interface elements. The integrated development environment (IDE) can include IDEs that are built using the open Eclipse Platform supported by the Eclipse Foundation (e.g., the Web Dynpro IDE developed by SAP, or the WebSphere Studio IDE developed by IBM Corp. of Armonk, N.Y.), as well as proprietary IDEs (e.g., the Visual Studio .NET IDE developed by Microsoft Corp. of Redmond, Wash.). The method can also include establishing one or more run-time services operable to be used by applications developed according to the programming model. The pattern component can invoke one or more of the run-time services during execution of the application. The run-time services can include a Web Dynpro runtime, virtual machines (e.g., the Java Virtual Machine), and the Common Language Runtime (a run-time system developed by Microsoft Corp.). The run-time systems can be hosted in multiple environments, including servers such as a J2EE-compliant server, such as the Web Application Server from SAP, or the WebSphere Application Server from IBM Corp.

In another aspect, there is a system that includes a pattern component. The pattern component is adapted to receive configuration data for a pattern. The pattern includes a predefined arrangement of user interface elements and specifies predefined actions that can be performed using the user interface elements. The configuration data includes a first version identification and specifies associations between one or more of the user interface elements and one or more entities in a back-end system. The pattern component is also adapted to access the back-end system and obtain a second version identification, and, if the first version identification does not match the second version identification, modify the configuration data based on information about the back-end system.

Other examples can include one or more of the following features. The first version identification and the second version identification can each correspond to a version of the back-end system. The first version identification and the second version identification can each correspond to a version of a specific entity in the back-end system. The pattern component can be adapted so that obtaining the second version identification does not have to be executed until an application corresponding to the configuration data accesses the specific entity in the back-end system. The pattern component can be adapted to access the back-end system and to modify the configuration data when an application corresponding to the configuration data is first launched.

The pattern component can be adapted to disregard an added entity in the back-end system. The added entity can include an added field. The pattern component can be adapted to disregard a deleted entity not included in the back-end system but referenced in the configuration data. The deleted entity can include a deleted field.

The pattern component can be adapted to disable functionality associated with a deleted entity not included in the back-end system but referenced in the configuration data. The functionality can include displaying data associated with the deleted entity. The functionality can include invoking one of the predefined actions in association with the deleted entity. The pattern component can be adapted to display a notification message related to the deleted entity. The pattern component can be adapted to modify one or more of the user interface elements that are associated with a modified entity in the back-end system. The information about the back-end system can include a data type associated with the modified entity.

The pattern component can be adapted to enable a user to specify whether to save the configuration data. The information about the back-end system can include a flag. The pattern component can be adapted to display an added entity in the back-end system that is associated with the flag. The pattern component can be adapted to highlight a modified entity in the back-end system that is associated with the flag. The pattern component can be adapted to terminate execution of an application if the flag is associated with a deleted entity not included in the back-end system but referenced in the configuration data. The pattern component can be adapted to persist the modified configuration data in a configuration file associated with the configuration file.

The pattern can be a first pattern and the pattern component can be adapted to establish an integrated development environment for developing applications based on a programming model and establish a plurality of patterns including the first pattern, with each pattern including a predefined arrangement of user interface elements and specifying predefined actions that can be performed using the user interface elements, and each pattern having an associated configuration application and an associated pattern component. Each configuration application and each pattern component can be developed using the integrated development environment and conforms to the programming model. The application can be developed by executing the configuration application for the first pattern to produce configuration data for the first pattern, where the configuration data specifies associations between one or more of the user interface elements and one or more entities in the back-end system, and further specifying customization data for the user interface elements. The integrated development environment (IDE) can include IDEs that are built using the open Eclipse Platform supported by the Eclipse Foundation (e.g., the Web Dynpro IDE developed by SAP, or the WebSphere Studio IDE developed by IBM Corp. of Armonk, N.Y.), as well as proprietary IDEs (e.g., the Visual Studio .NET IDE developed by Microsoft Corp. of Redmond, Wash.). One or more run-time services operable to be used by applications developed according to the programming model can be established. The pattern component can invoke one or more of the run-time services during execution of the application. The run-time services can include a Web Dynpro runtime, virtual machines (e.g., the Java Virtual Machine), and the Common Language Runtime (a run-time system developed by Microsoft Corp.). The run-time systems can be hosted in multiple environments, including servers such as a J2EE-compliant server, such as the Web Application Server from SAP, or the WebSphere Application Server from IBM Corp.

Implementations can realize one or more of the following advantages. A pattern-based application can execute even when the state of the back-end system on which the configuration data is based has changed. This allows the modification of back-end systems without the need of keeping track of all configuration data/pattern-based applications that are associated with the back-end system. The pattern-based application can determine itself whether the configuration data matches the data in the back-end system. If the two do not match, the pattern-based application can take action according to some logic so that the application executes instead of crashing. Changes in the back-end, requiring changes in the UI implementation, can be done at a small set of places, the pattern components. Without patterns, this logic for the changes is spread across thousands of coded applications. One implementation of the invention provides all of the above advantages.

The details of one or more examples are set forth in the accompanying drawings and the description below. Further features, aspects, and advantages of the invention will become apparent from the description, the drawings, and the claims.

BRIEF DESCRIPTION OF THE DRAWINGS

FIG. 1 is a screenshot of a user interface.

Like reference numbers and designations in the various drawings indicate like elements.

DETAILED DESCRIPTION

Overview of UI Patterns

Figure 1:
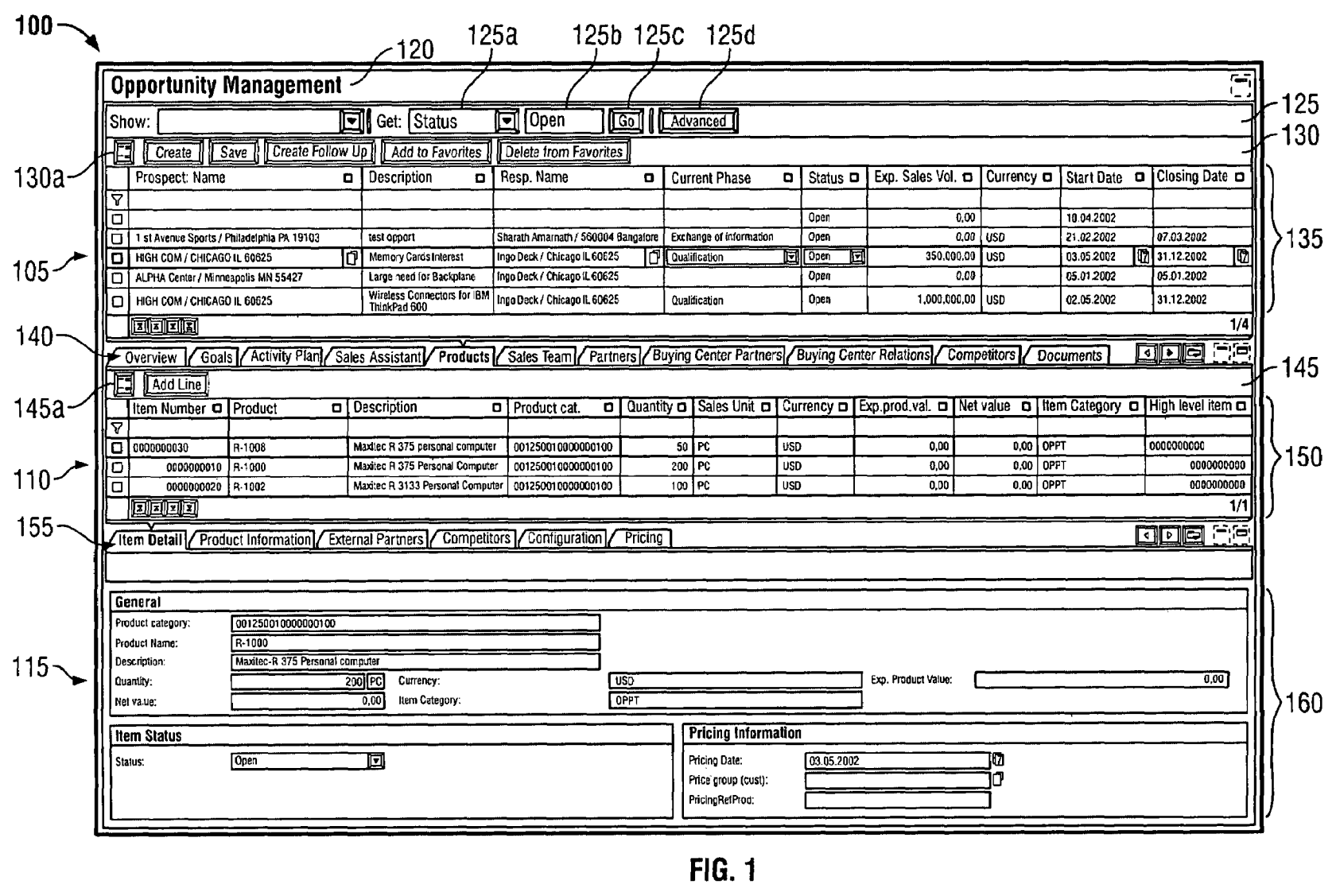
Figure 2:
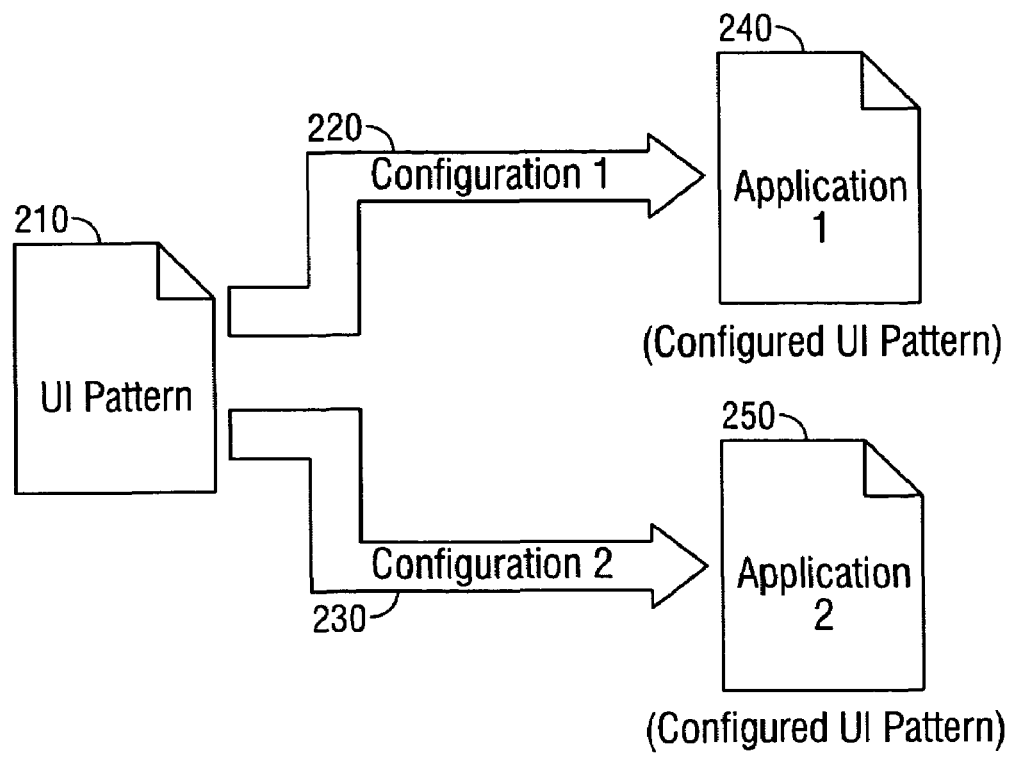
FIG. 2 is a block diagram illustrating the configuration of a UI pattern.

FIG. 1 illustrates a screenshot of a user interface 100. User interfaces typically contain various UI elements, including controls (e.g., drop down element 125*a*, text box element 125*b*, or button element 125*c*) and data elements (e.g., content area 135), arranged into application screens or views. The design of a user interface, including the layout of the UI elements and the navigation between the UI elements and between the views, is usually left up to the application developer. Thus, if the task of developing the same application is given to a number of application developers, each developer may design a different user interface for that application. Although each version of the application implements the same functionality, the user interfaces may be significantly different from each other.

A more constrained and structured approach to developing user interfaces is to build them using user interface patterns. A UI pattern (sometimes referred to simply as a pattern) is a configurable, reusable user interface unit designed to let users accomplish a specific but generically-defined task, such as searching for business objects, and editing the objects that are retrieved. Generally, each UI pattern has a specific semantic meaning and defined interaction behavior. In one implementation, each UI pattern includes a predefined arrangement of UI elements. Using UI patterns promotes uniform design throughout an application or group of applications because similar tasks are represented and handled in the same manner. For example, a user can always search in the same way, whether searching for a sales order, a business partner, or a product.

UI patterns can be defined at various levels, and can be nested within each other, thus creating hierarchies of patterns. At the top level of the hierarchy, a pattern can act as a "floor plan" for a user interface that is designed to help end-users complete a specific business process. The floor plan defines the user interface by specifying an overall screen layout for the user interface and managing and orchestrating any nested patterns.

One example of an important business process is working with business documents. A business document (e.g., a sales order or an invoice) is a high-level business object that can contain references to other business objects (e.g., objects corresponding to the items in a sales order and to the customer that placed the sales order). The process of working with business documents typically involves finding an existing business document or creating a new business document, and then displaying and editing the document. To help a user accomplish these tasks, an application should include a user interface that assists the user in locating the business document to be edited, and then presents the logical parts of the business document (e.g., the referenced objects that contain the customer data and the sales order items) in a clear and structured manner. The user interface should display the relevant data in an appropriate format for the given context (e.g., in a table, a form, or a chart). The user interface should also provide input help where applicable, and supply application documentation if needed. After the user has finished editing the business document (including objects referenced by the document), the user interface should also help the user carry out post-editing tasks, such as printing out the business document, and performing document lifecycle actions (e.g., saving, deleting, creating, or updating).

An example floor plan for such a user interface can specify that an application screen is to be divided into three sections, with a top section for searching for and selecting business objects, a middle section for showing the details of an object selected in the top section, and a bottom section for showing the details of a sub-object of the object in the middle section.

More detailed, lower-level patterns can be used for each of the sections specified in a floor plan. For example, an object identification pattern (OIP) can be used for the top section in the floor plan specified above. An OIP pattern (an example of which is provided below), can specify, for instance, that a section of the screen is to include a search bar with various text entry fields and buttons at the top, and an area below the search bar where content (i.e., the content returned as a result of a search) is to be displayed.

This process can continue with the definition and hierarchical nesting of even lower-level patterns. For example, the OIP pattern above can specify that the content display area is to include a table control for displaying the results of a search. The table control can be a complex control that lets users perform tasks such as selecting and sorting rows in the table, and editing entries directly in the table. In this scenario, the table control itself can be thought of as a low-level pattern.

The user interface 100 shown in FIG. 1 illustrates an example of a pattern-based user interface. The user interface 100 has a floor plan that includes an object identification pattern (OIP) 105 and two object data patterns (ODPs) 110 and 115. As described below, object identification pattern 105 and object data patterns 110 and 115 are made up of embedded lower-level patterns, such as a data view, a form pane, a list pane, or a chart pane. Each embedded pattern can include further embedded patterns, including, for example, tool bars, tables, tab strips, and other UI pattern elements.

Object identification pattern 105 is a pattern that provides an interface for searching for objects (using zero or more selected criteria), and for displaying objects found to meet those criteria. Like the floor plan pattern, OIP 105 is itself a pattern with several embedded elements. Object identification pattern 105 includes a title bar 120, a search bar 125, a tool bar 130, and a content area 135.

Title bar 120 orients the user. Search bar 125 enables the user to enter zero or more search criteria to locate objects of interest. For example, search bar 125 includes a drop down element 125a that lists the fields for which the user can enter a search term. Drop down element 125a illustrated in FIG. 1 shows that the user has selected the field "Status" for searching. Search bar 125 also includes a text box element 125b that allows a user to enter a search term to identify the objects of interest. Text box element 125b illustrated in FIG. 1 shows that the user has entered "Open" as the value to find in the "Status" field. Search bar 125 also includes a "Go" button element 125c that initiates the search based on user input in elements 125a and 125b. With the word "Get" located in front of drop down element 125a, search bar 125 reads "Get Status Open Go", which provides a reusable and intuitively understandable mechanism for initiating user searches.

Search bar 125 also includes an "Advanced" button element 125d that allows a user to initiate an advanced search. Upon pushing button 125d, a form pane is rendered between search bar 125 and tool bar 130. The form pane can include, for example, each of the fields that are in drop down element 125a, and a text box besides each field. Thus, the user can enter search terms for multiple fields to create more focused searches, thereby limiting the number of objects that appear in content area 135.

Tool bar 130 provides functions that the user can perform on the objects displayed in the content area 135, such as create, save, and add to and delete from the user's list of favorite objects. Tool bar 130 also includes a toggle control 130a that allows a user to toggle the layout of content area 135 between different types of panes that provide different representations of the objects retrieved by a search. For example, a list pane displays a tabular representation of the objects (as illustrated in FIG. 1). A form pane displays the object that is currently selected, with each field in the object having a control (e.g., a text box, a pull down menu, or a check box) to enable a user to change data associated with that field. As another example, a chart pane can display a graphical representation of the retrieved data. Panes can be developed to meet specific needs, and can be integrated as low-level patterns into high-level patterns such as OIPs and ODPs.

As indicated above, content area 135 displays those objects that meet the search criteria specified by the user. Selecting an object in content area 135 determines what is displayed in object data pattern (ODP) 110. ODP 110 is a pattern that displays detail data associated with the selected object from content area 135. ODP 110 includes a tab bar 140, a tool bar 145, and a content area 150. Tab bar 140 selects the type of data that is displayed in content area 150. FIG. 1 depicts the "Products" tab as having been selected, so the data in content area 150 corresponds to product data (e.g., a list of products with item numbers, product descriptions, quantities, and the like) associated with the object selected in content area 135. Tool bar 145 includes a toggle button 145a that allows a user to toggle the layout of content area 150 between a list pane (as currently illustrated in FIG. 1) and another type of pane (e.g., a form pane or a chart pane).

Selecting an object in content area 150 determines what is displayed in object data pattern (ODP) 115. ODP 115 is a pattern that displays detail data associated with the selected object from content area 150. ODP 115 includes a tab bar 155 and a content area 160. Tab bar 155 selects the type of data that is displayed in content area 160. FIG. 1 depicts the "Item Detail" tab as selected, so the data in content area 160 corresponds to item detail data (e.g., a form pane with item details such as product description, quantity, net value, status, and the like) associated with the object selected in content area 150.

As an example of a different floor plan, ODP 115 can be replaced with a guided data entry pattern (GDP). A GDP is a pattern that guides the user through a sequence of steps in a task. A GDP can contain a step bar and a data entry area, similar to tab strip 155 and content area 160 of ODP 115. The step bar of the GDP however, represents the steps of the guided process. For example, using tab strip 155 for illustration, the "Item Detail" tab would be a "Step 1" tab, the "Product Information" tab would be a "Step 2" tab and so on. In execution, the GDP would start on the "Step 1" tab and display in the data entry area the fields that the user must enter for the first step of the process. When the user clicks on the "Step 2" tab, the data entry area would change for the second step of the process. In one implementation of a GDP, the user is not permitted to perform steps out of sequence (e.g., to go from the "Step 1" tab to the "Step 3" tab), or to proceed to the next step until the current step is completed (e.g., the user is not allowed to select a subsequent tab or enter data for a subsequent tab until data entry for the current tab is complete). In another implementation, whether or not the user is allowed to perform steps out of sequence is left as a choice for the application developer to specify as part of a configuration for a GDP.

The UI patterns described above and in the remainder of this application (e.g., OIPs, ODPs, and GDPs) are meant to serve only as illustrative, concrete examples of patterns. Patterns can be created to let users accomplish any generically-defined task, and the concepts and techniques described in this application apply to and can be used with all such patterns, and are not to be restricted to the example patterns discussed herein.

Configuring UI Patterns

User interface 100 of FIG. 1 illustrates a particular application that is based on the patterns described above. Such an application will be referred to as a pattern-based application, a pattern application, or simply an application. As explained above, UI patterns are reusable user interface units designed for generic tasks—for example, an OIP pattern is designed for the task of searching for and selecting business objects stored in a back-end system (e.g., a database). In order to create a concrete user interface, e.g., user interface 100 with OIP 105, UI patterns need to be configured. FIG. 2 illustrates an example in which a UI pattern 210 is configured (shown using arrows 220 and 230) to create two UI applications 240 and 250. Configuration one 220 is used to create application one 240, and configuration two 230 is used to create application two 250.

Configuration is the process through which a UI pattern is developed into an actual user interface (or portion thereof) for an actual application. For illustrative purposes, this might be compared to instantiating an object of a specified class—the UI pattern (comparable to a class) specifies the general properties of a portion of a user interface, and a configured pattern (comparable to an instantiated object) specifies the actual properties of the portion of the user interface for an actual application. UI pattern 210 represents the general properties of the UI portion—for example, that a table is included in that UI portion, and that the location of the table is under a title bar. Configuration one 220 represents the process of specifying the specifics of the UI portion (for example, the specific columns that will be included in the table when the table is rendered), so as to create an application (for example, application one 240) that displays a UI with a table under the title bar with specific columns defined by configuration one 220. Similarly, application two 250 displays a table, but with specific columns as defined by configuration two 230.

A configuration can also specify what back-end systems and data are to be used for a pattern. For example, configuration one 220 can specify a particular back-end system (e.g., a local or remote database system) and a particular service to use to access the data on that back-end system that is to be displayed in the table in the UI pattern 210. Examples of services that can be used to access a host system include web services, Enterprise Java Beans (EJBs), Business Application Programming Interfaces (BAPIs) developed by SAP AG of Walldorf (Baden), Germany (SAP), and other business logic services.

As another example of a configuration, an OIP might specify that a user interface is to include a search bar at the top of the interface and a content area below the search bar. The search bar is to include a drop down box for selecting a search field, a text box for entering a query string, and a "Go" button for executing searches. Configuring such a pattern is the process of providing specifics for the pattern for an actual application. For example, to configure the OIP pattern, an application developer can specify the search fields to be included in the drop down box, the query to run when the "Go" button is pressed, the back-end system in which to run the query (i.e., the system where the actual data is located), and the columns from the returned results to display in the content area.

In some implementations, a UI pattern can have a number of predefined layouts (e.g., a grid layout and a flow layout), and the application developer can decide which of the available layouts to use as part of the configuration process. Moreover, each layout can be further configurable, providing the application developer with further configuration options (e.g., an option to create groupings of fields or other elements). In yet other implementations, a pattern can be defined to have a fully configurable layout, giving the application developer complete freedom to modify the arrangement of the elements in the pattern (e.g., by using a graphical configuration tool to specify screen positions for each element in the patter).

Thus, the degree to which each UI pattern is configurable can vary. For example, the degree to which the arrangement of elements in a pattern can be configured can vary across a spectrum—for some patterns, the arrangement of UI elements can be fully predefined, leaving no configuration options for the application developer; for some patterns, the application developer can be given an option to choose between a handful of predefined arrangements; and for other patterns, the application developer can be given full freedom to define a custom arrangement of elements.

Other pattern properties can also be partially or fully configurable. For example, a developer can be given no options or a few options regarding the actions to be performed by a UI element in a pattern. Or the developer can be allowed to define and associate a custom action with an element in a pattern.

As can be seen from the prior discussion, the term "configuration" can be used in multiple ways. First, "configuration" is the process by which a pattern is developed into a concrete user interface (or portion thereof) for a concrete application. A "configuration" also refers to the data that is produced as a result of the configuration process—i.e., it is the set of data that defines a concrete user interface based on a pattern. Finally, "configuration" can also be used to refer to the set of options provided during the configuration process. As used in this manner, a selected option in a configuration produces a defined item of configuration data.

The use of patterns to develop applications creates two potential levels of re-use. First of all, patterns serve as re-usable building blocks for building user interfaces. For example, an OIP can be used to create two different user interfaces—a first configuration can define a user interface for searching for business objects related to customers (customer objects), and a second configuration can define a second user interface for searching for business objects related to inventory (inventory objects).

In addition, configurations can be reused, meaning that the configurations themselves can serve as re-usable building blocks for building applications. Thus, in the example above, the OIP configuration that defines a user interface for searching for customer objects can be integrated and used in two different applications (e.g., a customer relationship management application and a billing application).

The configuration of a UI pattern can be done either manually (e.g., with a text editor), or through the use of a configuration application. A configuration application facilitates the process of configuring a UI pattern. In one implementation, the configuration application displays multiple configuration options for the application developer to select. As the selections are made, the configuration application displays a WYSIWYG representation of the resulting configured user interface, thereby allowing the application developer to preview his selections and make any necessary modifications. The configuration options can include lists of the available back-end systems, queries, query fields, and query results.

Once the application developer has finished selecting the configuration options, the selections are stored as configuration data for the UI pattern. The configuration data can include associations between one or more of the UI elements in the UI pattern and one or more of the back-end entities to be used with the UI pattern. As an example, configuration data for the OIP described above can include a specification of the back-end system to be used, the query to be run in the back-end system, the query fields to show in the drop down box, and the result fields to display in the content area.

The configuration data can also include customization data for one or more of the UI elements in the UI pattern. The customization data can specify local changes to the business objects associated with the UI elements. For example, a drop-down menu item might be associated with a back-end query field called "UID". The customization data may specify that the "UID" field should be displayed using a more user-friendly label, for example, "reference number". Such a customization applies only to the particular UI element in the particular application being configured, and does not affect how the business object is represented in the back-end system or how the business object is represented by other UI elements in other applications that use the same UI pattern.

The configuration data can be stored in a configuration repository. In one implementation, the configuration data is stored in one or more files. Such files can be nested to reflect a hierarchical arrangement of further UI patterns. The configuration data can then be read by a pattern component, which generates the implementation of the actual user interface for the application based on the configuration data.

Figure 3:
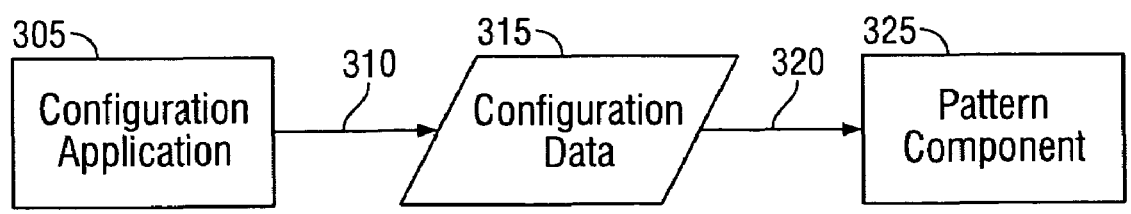
FIG. 3 is a block diagram illustrating the use of a configuration application.

FIG. 3. illustrates the use of a configuration application 305 to create 310 configuration data 315, which is combined 320 with a UI pattern component 325 to produce a pattern-based application. The configuration application 305 generates configuration data 315 that is specific to pattern component 325. That is, the configuration application 305 can ensure that a configuration schema for pattern component 325 is followed.

The generation of a pattern-based application based on a configuration can be done either immediately after the configuration has been completed, or at a subsequent point in time, such as when the pattern-based application is executed.

For example, in the scenario described above where a configuration application produces configuration data for a pattern component, the pattern component can read the configuration data and generate the pattern-based application immediately after the configuration data has been produced.

This is referred to as a design-time generation of a pattern-based application, since the generation occurs when the configuration is produced (i.e., when the configured pattern or application is designed).

Alternatively, the pattern component can read the configuration data and generate the implementation of the corresponding pattern-based application when the pattern-based application is executed by an end-user. This is referred to as a run-time or on-demand generation of a pattern-based application. In one implementation, the choice of whether the implementation of a pattern should be generated at design time or at run time is left as an option for the application developer. The use of configuration data to generate an implementation of a pattern (e.g., a configured pattern component) is described in more detail below.

Application Development Framework

Figure 5:
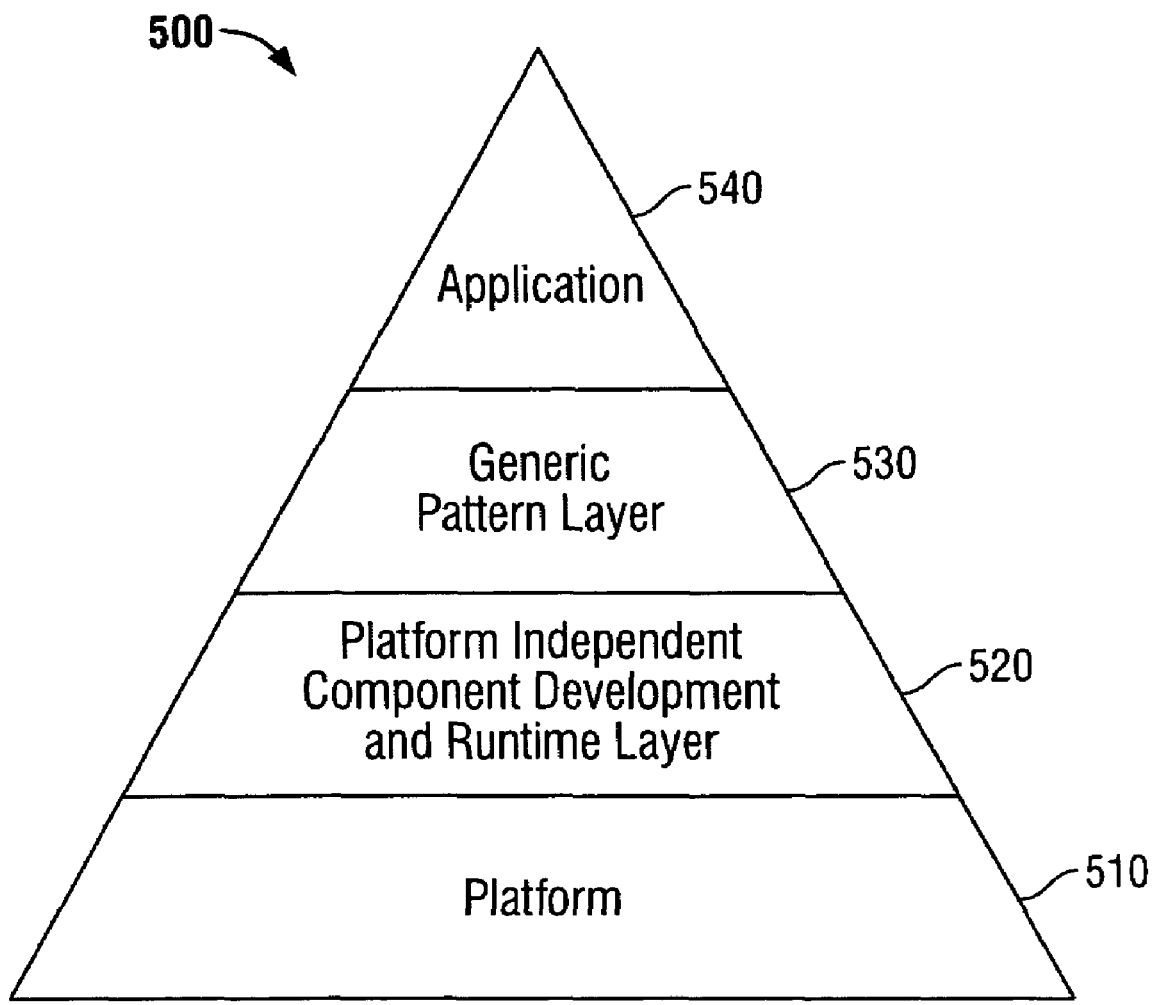
FIG. 5 is a block diagram of a framework for simplifying application development.

FIG. 5. illustrates an example framework 500 for application development based on the configuration of patterns. At the base, framework 500 includes a platform layer 510 on which applications execute. Two example platform layers 510 are the Java 2 Platform, Enterprise Edition (J2EE), manufactured by Sun Microsystems, Inc. of Santa Clara, Calif. and the Advanced Business Application Programming (ABAP)-based platform manufactured by SAP. The platform layer is generally chosen (or already established) by the enterprise that executes the applications.

To enable applications to execute on different platform layers 510, framework 500 includes a platform independent component development and run-time layer 520. In this environment, applications can be developed using modules known as components. Components can be stored in a component repository and reused—that is, each component can have more than one instance, where the component instances are used in multiple applications, or multiple times in the same application. Components can be embedded (nested) within other components, and they can have zero or more visual representations. In one implementation, each component provides three separate interfaces—a programming interface, a data binding interface, and a visual interface. The programming interface can be used by an embedding entity (a component embedder—e.g., a higher level component, or an application) to interact with the embedded component. The visual interface can be used by a component embedder to access and use the visual representations of the embedded component (for example, to form the component embedder's own visual representation). The data binding interface can be used by the component embedder to exchange data with the embedded component.

An example platform independent component development and runtime layer 520 is the Web Dynpro environment manufactured by SAP. The Web Dynpro environment is based on the Web Dynpro programming model, which conforms to the model-view-controller programming paradigm described below with respect to FIGS. 6A and 6B. In one implementation, platform independent layer 520 provides a framework for defining application components in a declarative and/or graphical manner, without needing to program the components for a particular platform layer 510. Platform independent layer 520 also provides interfaces, tools, services, and other features to enable the application components to execute on a specific platform layer 510. In another implementation, platform independent layer 520 additionally provides functionality to enable application components to render user interfaces on a number of different clients, with platform independent layer 520 performing the appropriate transformations for specific clients.

Building on top of platform independent layer 520, framework 500 includes a pattern layer 530 with one or more generic UI patterns. Each UI pattern is generic because it defines a particular pattern (e.g., a floor plan pattern, an OIP, an ODP, a GDP, and the like), but not the specific content that is included for a specific application that uses that pattern. The specific content for a specific application is created by configuring the pattern as described above.

In one implementation, each UI pattern includes a configuration application and a pattern component. The configuration application and the pattern component for each UI pattern can be applications that are developed and executed on the platform independent layer 520 shown in FIG. 5. Using this approach, the configuration application and the pattern component for each UI pattern can take advantage of the features offered by platform independent layer 520, including, for example, platform independence, client independence, and various functionality offered by platform independent layer 520, such as automatic input help and validation based on declared data types.

Figure 4A:
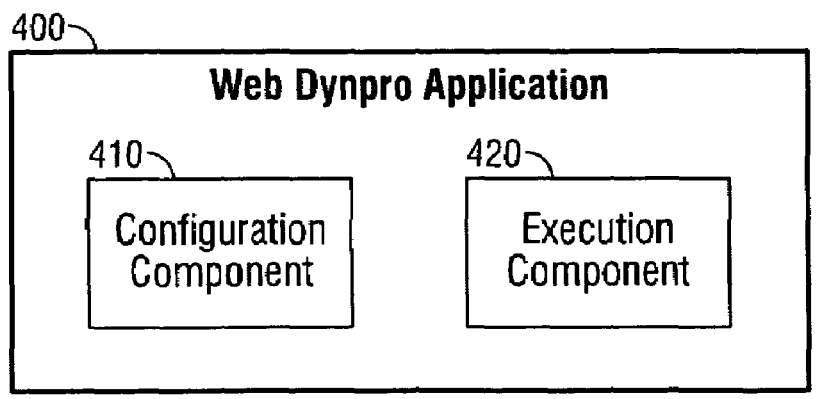
FIGS. 4A-4C illustrate block diagrams of three implementations of a UI pattern.
Figure 4B:
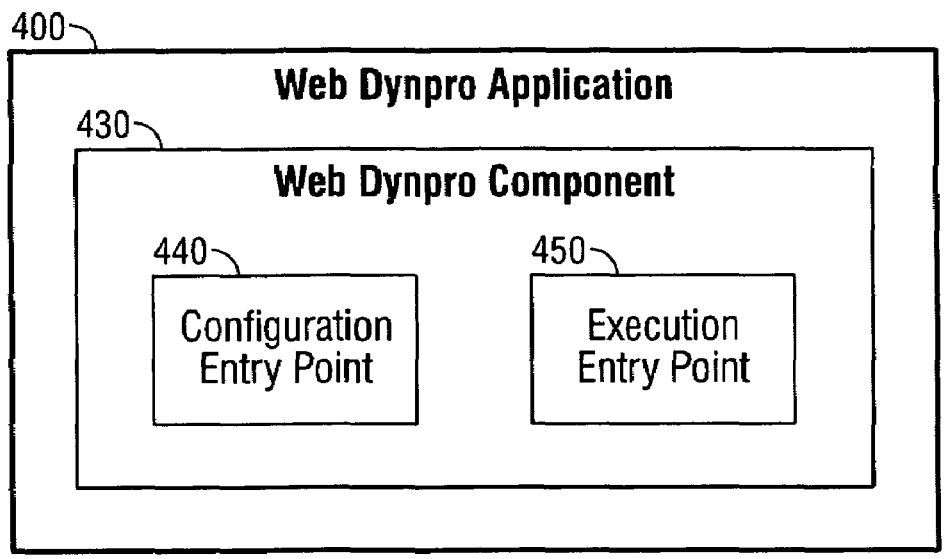

In one implementation, each UI pattern is implemented as a single Web Dynpro application 400, illustrated in FIG. 4A. The single Web Dynpro application has two components, a configuration component 410 that performs the functionality of the configuration application, and an execution component 420 that performs the functionality of the pattern component. Alternatively, as illustrated in FIG. 4B, the Web Dynpro application 400 can be developed using a single component 430 with two entry points—one for configuration 440 and one for execution 450. The application 400 uses a different entry point depending on whether it is being used for configuration or execution of the pattern.

Figure 4C:
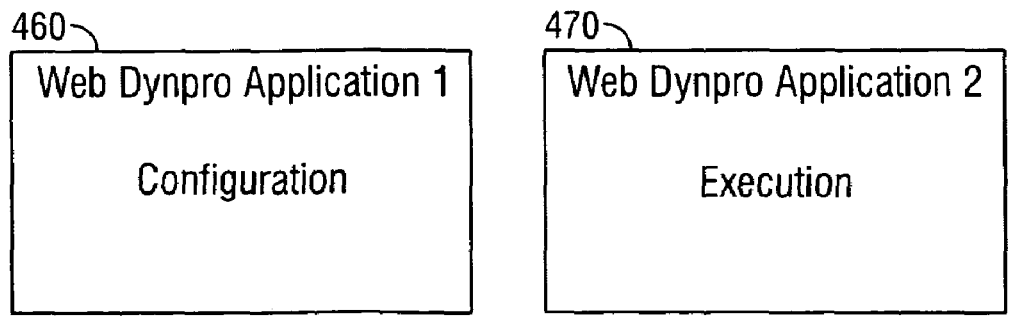

Yet another alternative, illustrated in FIG. 4C, is for each UI pattern to be implemented as two separate Web Dynpro applications—one for configuration 460 and one for execution 470. Each of the two Web Dynpro applications is developed using a separate component—i.e., the configuration application 460 includes a configuration component, and the execution application 470 includes a pattern or execution component.

Referring back to FIG. 5, the top layer, application layer 540, contains the actual applications to be run by end-users. In this framework, an end-user application is made up of one or more configured UI patterns. In an implementation where each UI pattern includes a pattern component, an end-user application is made up of one or more configured pattern components (e.g., pattern components and their corresponding configurations). An end-user application can be stored in a configuration repository in the form of configuration data and references to the associated pattern components.

Framework 500 thus enables application developers to develop applications by configuring generic pattern components into components for specific applications (e.g., components that display the actual fields illustrated in UI 100). In one implementation, as described in more detail below, configuration data (e.g., data in a configuration repository or in one or more configuration files) is used to configure a generic pattern component into a component for a specific application. The configuration data can be defined through the use of declarative and/or graphical tools that are included, for example, in a configuration application, thus dramatically simplifying the task of developing applications. If, for example, the configuration application has access to a meta data repository that specifies the fields available for a particular back-end system for which an application is being developed, the application developer can develop an application (e.g., create a configuration) by simply choosing the fields in the meta data repository to be included (e.g., displayed) in the application.

Framework 500 can be thought of as creating a role-based programming methodology, where layers 510, 520, 530, and 540 correspond to different roles for different developers. Framework 500 is illustrated as a triangle to represent graphically that complexity and difficulty decrease for each role as one moves from the base layer to the top layer. Thus, a developer who is responsible for building and maintaining the platform independent layer 520 has the most complex and difficult job, and must be familiar with the programming languages, tools, and other intricacies of one or more platform layers 510. A developer who is responsible for building and maintaining UI patterns (e.g., configuration applications and pattern components) has a simpler job, as he or she can take advantage of the features and functionality offered by the platform independent layer 520, as described above. Finally an application developer (a developer who is responsible for developing end-user applications) has the least complex job, as he or she can create applications simply by configuring predefined UI patterns. Where the configuration process is as simple as using a configuration application to choose the desired fields from a set of available fields, the application developer may not need to have any advanced programming skills.

Example OIP Pattern Component

Figure 6A:
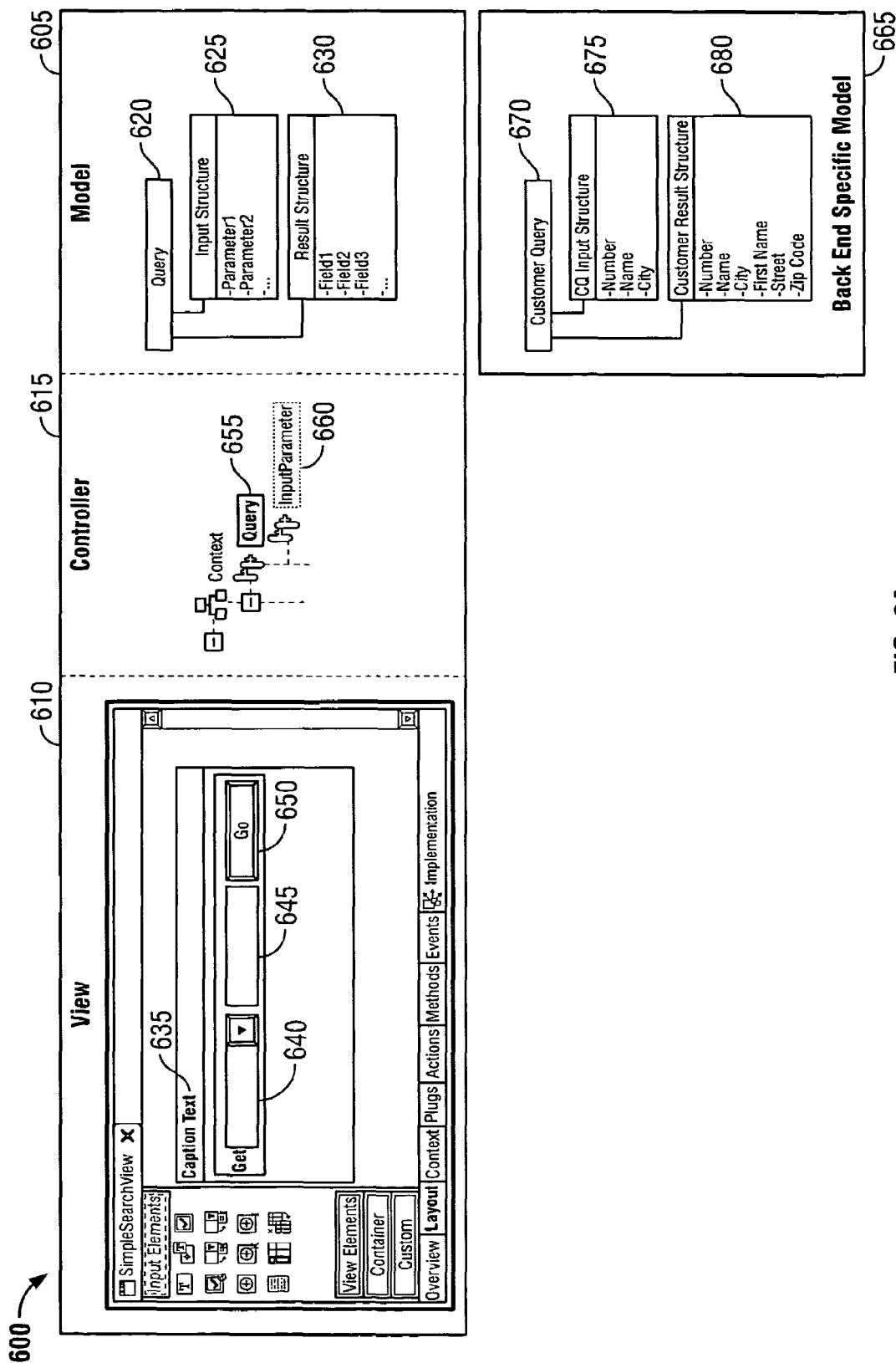
FIGS. 6A-6B are block diagrams of a configurable pattern component for a search pattern.

As described above, an application can be built by configuring a generic pattern component. FIG. 6A illustrates an example of a generic pattern component 600 for an OIP. Component 600 follows a model-view-controller (MVC) paradigm, and as such includes a model 605, a view 610, and a controller 615. In the MVC paradigm, models generally implement application logic. Each model can have multiple views, where each view displays information about the model to a user. A controller of the application receives events, for example, raised by a user interacting with a view to manipulate the model. A model can have multiple controllers. Controllers can relate to zero or more views. Controllers can also relate to an application in general, or to one or more application parts or components. Models and controllers typically include application code. When changes occur in a model, the model can update its views. Data binding can be used for data transport between a view and its model or controller. For example, a table view can be defined to display data from a corresponding table that is stored in a model or controller. The table view is thus bound to the table, indicating that the table is to be used as the data source for the table view. As another example, the table view can be replaced by a further view, such as a linked list, that binds against the same table. In this case, the further view can display the table data without requiring any changes to be made to the controller or the model.

As explained earlier, an OIP provides an interface to search for and select objects. Accordingly, the model 605 in the OIP component 600 includes a query 620 (e.g., a query class). Because an OIP is a generic UI pattern, query 620 represents a generic query. In one implementation, query 620 includes an input structure 625 of n parameters allowed for queries, and a result structure 630 of m fields returned for each object meeting the search criteria.

View 610 of component 600 defines a user interface with a generic arrangement of UI elements for performing searches. View 610 includes a title bar 635 that displays a caption to orient the user. View 610 also includes a search bar with a drop down element 640 in which the user can select from the available input parameters selected from the input structure 625. The search bar also includes a text entry box 645 in which the user can enter a match criterion for a search, and a "Go" button 650 to initiate the search.

Controller 615 of component 600 binds the UI elements of view 610 (e.g., UI elements 635, 640, and 645) to data elements in a storage area (referred to as a context) that is associated with the controller 615. The context is a structured storage area with hierarchically arranged nodes and attributes. The context associated with the controller 615 includes a query node 655 that includes an input structure 660. The input structure 660 in the controller context corresponds to the input structure 625 in the model 605, and can include up to the n parameters included in the input structure 625.

When the OIP pattern component 600 executes, the component receives configuration data (e.g., from a configuration repository or one or more configuration files), and, based on that configuration data, generates child elements for the input structure context node 660, and binds those elements to elements in the view 610 and the model 605.

As an example, consider an application that allows end-users to search for and retrieve information about a company's customers. To create such an application, a developer can configure an OIP pattern to use a specific back-end system with customer information, e.g., a system represented by back-end specific model 665. Back-end specific model 665 indicates that the back-end system in this example can execute a query called customer query 670 that takes up to three input parameters (a customer number, customer name, and customer city, as specified in the customer query input structure 675), and returns records with six fields (the six fields specified in the customer result structure 680). In an example configuration, an application developer might specify that users should be able to run searches based on any of the three available input parameters (i.e., that all three of the input parameters in the customer query input structure 675 should be listed in the drop down element 640). The developer might further specify that the content display area below the search bar in view 610 should display all six of the available return fields listed in customer result structure 680.

Figure 6B:
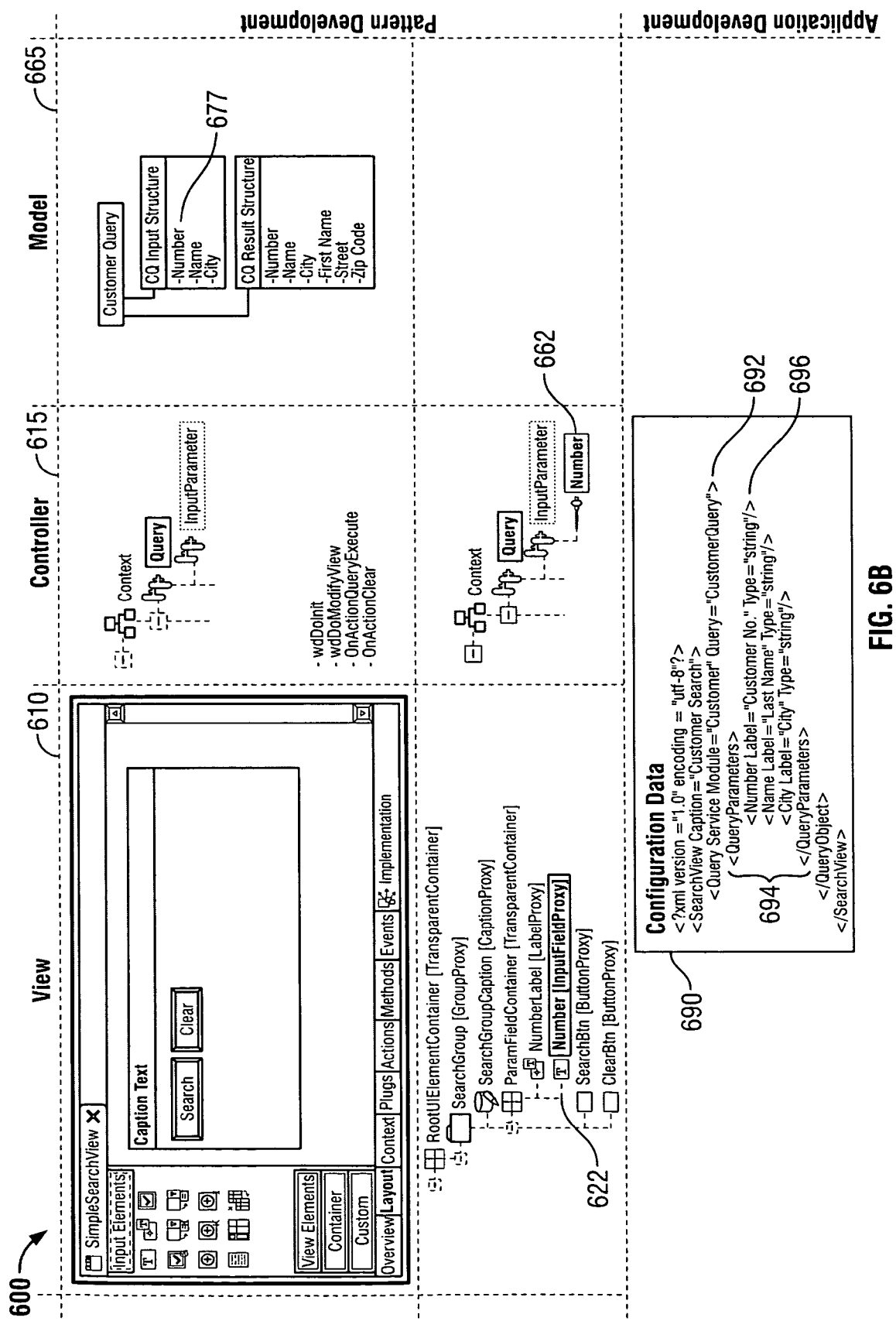

The preceding configuration can be specified as configuration data, an example of which is shown as XML data 690 in FIG. 6B. The XML configuration data 690, which is discussed in more detail below, can be used to generate the execution-related entities in the pattern component 600 that are required to implement the specified configuration for the OIP pattern. For example, in an implementation in which applications (including pattern components) are structured according to the Web Dynpro programming model, several types of entities can be generated based on the configuration data, including UI elements (e.g., controls in views), data structures (e.g., context entities such as nodes and attributes), and bindings (e.g., context bindings, which serve to couple UI elements and context entities, and model bindings, which serve to couple context entities and model entities).

As a specific example, the XML configuration data 690 includes a first section of data 692 that indicates that the pattern component 600 is to execute searches using a query object named "CustomerQuery" in a back-end service module named "Customer." A service module is a grouping of functionality in a back-end system; the functionality can include business functionality that defines business objects or other entities (e.g., customers), and that provides access to such entities (e.g., through query objects such as CustomerQuery). In this example, the CustomerQuery query object is represented by the customer query object 670 in the model 665.

As discussed above, the application developer has chosen a configuration in which end-users are to be able to execute searches using any of the three available input parameters in the customer query object 670. This selection of input parameters is indicated in a second section of configuration data 694, which lists all three parameters (Number, Name, and City) from the input structure 675 in the customer query object 670.

In particular, the Number parameter 677 in the input structure 675 is listed in the section of configuration data 696. The Number parameter 677 represents customer numbers, and its selection as an available search parameter means that application end-users are to be able to search for customers by providing a customer number (as well as possible additional parameters). To enable such searches, a number of execution-related entities are added to the pattern component 600, including a Number UI element 622 and a Number context attribute 662.

The Number UI element 622 is added to the view 610 so that an end-user can type in a customer number in that UI element. Though not shown in the preview of the view 610 in FIG. 6B, the UI element 622 can be displayed and enabled in the view 610, for example, when an end-user selects an "advanced search" option that exposes a form with multiple fields in which the end-user can enter search criteria. Based on the configuration data 696, the UI element 622 is given the label "Customer No." Moreover, because the configuration data 696 indicates that string-type input is to be provided for the Number input parameter, the UI element 622 is set to be a control that is operable to receive such input (e.g., a text box).

The Number attribute 662 in the context associated with the controller 615 can be used by the pattern component 600 to store input data provided by an end-user in the UI element 622. As with the type of the Number UI element 622, the type of the Number attribute 662 can be set based on the data type indicated in the configuration data 696 (in this case, a "string" type). The coupling between the Number UI element 622 and the Number attribute 662 can be enabled by binding the Number UI element 622 and the Number attribute 662. Bindings between other types of entities can also be created—for example, a context attribute (e.g., the Number attribute 662) can be bound to a model entity (e.g., the Number parameter 677 in the input structure 675 of the query object 670). Such a binding, known as a model binding, generally serves to couple an item with a model entity that represents an abstraction of business logic in a back-end system.

Similar entities (e.g., UI elements, data structure elements, and bindings) can be generated for the other two input parameters (Name and City) specified in the section of configuration data 694. In addition, many other types of entities can be generated based on the configuration data specified by an application developer. Such entities can be used by a pattern component for purposes of navigation and for other UI-related issues. For example, various entities can be generated for purposes of implementing advanced UI functionality, such as input help and input validation.

The use of configuration data to generate execution-related entities for a pattern component can be carried out at various times, including, for example, in a pre-execution step (e.g., after the configuration data has been specified), when the pattern component or application is loaded into a runtime system or otherwise launched, or during execution of the pattern component or application. In one implementation, the entities are generated on an on-demand basis as they are needed. For instance, in the preceding example, the Number UI element 622 can be generated when the view 610 is first displayed, or even when the Number UI element 622 first becomes visible (e.g., when the end-user exposes an "advanced search" form in the view 610).

Example Configuration Data

To configure a UI pattern (e.g., as in the example configuration described above), a developer can associate the pattern with a specific back-end system and the entities (e.g., queries, input structure, input parameters, input fields, result structure, and/or result fields) available within that back-end system. As described above, such an association can be specified as configuration data stored in a configuration repository or in one or more configuration files. The application developer can use a configuration application that assists him in selecting a back-end system, determining which parameters and other entities exist in the back-end system, selecting an appropriate set of those entities for an application, and specifying all such selections as formatted configuration data (e.g., in a formatted configuration file).

In one implementation, the configuration application uses an interface layer that provides a generic interface to back-end systems. An example of such an interface layer is the interface layer in the Enterprise Service Framework (ESF) developed by SAP. The interface layer includes a repository with meta data corresponding to the back-end data.

Using the example in FIG. 6B, the back-end specific model 665 can be stored as meta data in the meta data repository of an interface layer. The application developer can determine from this meta data that the customer query 670 (defined by the back-end system) is one used to find customer objects. The meta data repository further includes the parameters 675 of the input to the query, namely a number, a name, and a city. The configuration application enables the application developer to select any combination of input parameters 675 that is to be presented in drop down element 640 when view 610 is rendered. The application developer can also select which of the fields in result structure 680 are to be displayed when result objects are returned from the back-end system in response to a query.

An example of configuration data that defines the search portion of a specific application (i.e., that specifies a configuration for a search pattern) is shown below:

```
<?xml version="1.0" encoding="UTF-8" ?>
<SearchView Caption="Customer Search">
    <Query Service Module="Customer" Query="CustomerQuery">
        <QueryParameters>
            <Number Label="Customer No." Type="string"/>
            <Name Label="Last Name" Type="string"/>
            <City Label="City" Type="string"/>
        </QueryParameters>
    </Query>
</SearchView>
```

In this example, the configuration data is represented using XML. Taking the data in order, the first line defines the version and encoding of the XML file. The next line defines the caption that is inserted into the generic caption text 635 of pattern view 610. As indicated, the application associated with this configuration displays "Customer Search" in the title bar to orient the user that he or she is searching for customers. The next line specifies that the query to be executed for this application is the "CustomerQuery" query within the "Customer" service module in the back-end system.

The next five lines specify the input parameters selected by the application developer to be included in drop down element 640. As indicated in the data, the application developer has selected all three of the available input parameters 675, namely "Number", "Name", and "City". Further, the application developer has defined more user-friendly labels for each of the parameters. The configuration data also defines the data type for each of the parameters, so view 610 can provide an appropriate control for each selected field. For example, in an advanced search view, a checkbox can be provided for a Boolean type input parameter, rather than the text entry box that is typically used for string type input parameters.

Although an application developer can generate configuration data directly, the use of a configuration application can advantageously enforce the required schema for the configuration data, so as to ensure that the configuration data is successfully merged with a generic pattern component to generate a specific application.

Figure 7:
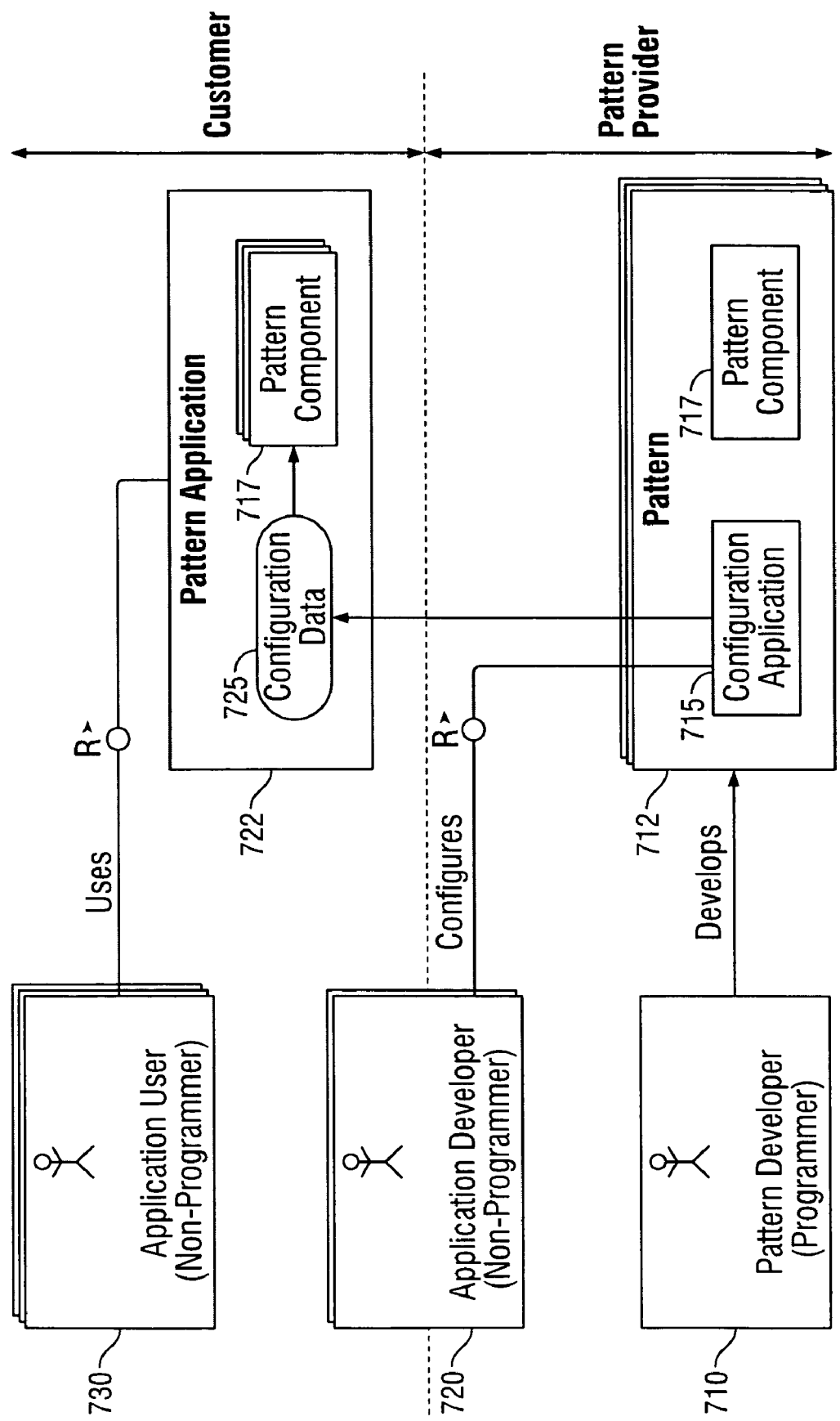
FIG. 7 is a block diagram illustrating different roles and functions involved in the development and use of UI patterns.

FIG. 7 illustrates example roles and functions that can be involved in the process of developing, configuring, and using pattern-based applications. The process begins with the development of pattern 712, which can include the development of a pattern or execution component 717, and a corresponding configuration application 715 that is used to produce configuration data 725 for the pattern component 717. Multiple levels of patterns, and multiple patterns within each level, can be developed. The top level can include different floor plans for different types of business processes. The development of patterns can be carried out by a pattern developer 710 in a pattern-providing organization ("pattern provider"). Pattern developers are typically skilled programmers.

To create a specific application 722 for a specific type of business process, an application developer 720 can configure a floor plan pattern that corresponds to that type of business process (as well as possibly one or more nested patterns). In the implementation shown in FIG. 7, the process of configuring a pattern involves the use of a configuration application 715 to create configuration data 725 for a corresponding pattern component 717. The configuration application 715 can be designed to be very simple to use—e.g., it can be designed to let an application developer configure a pattern by simply choosing among multiple alternatives for each required piece of configuration data. Accordingly, application developers need not have programming skills—rather, they can be non-technical people, such as program managers or business executives who are experts in a particular application or business area.

Multiple application development scenarios are possible. For example, patterns can be delivered by a pattern provider to a customer either with or without corresponding configurations. In the former scenario, an application developer on the pattern provider side configures a pattern and delivers a fully-configured pattern-based application 722 that is ready to be used by an application end-user 730 on the customer side. In the latter scenario, the pattern provider delivers only the patterns (e.g., the configuration applications and the pattern components) to the customer, and an application developer on the customer side creates a pattern application 722 by configuring one or more of the patterns. As another possible scenario, an application developer on the pattern provider side can create and deliver pre-configured applications, which can either be used directly by an end-user, or further adapted by an application developer on the customer side (e.g., by modifying the delivered configurations) in order to meet the specific needs of the customer.

Detecting and Handling Changes to Back-end System

As described above, to configure a pattern, a developer can associate the pattern with a specific back-end system and the entities (e.g., queries, input structure, input parameters, input fields, result structure, and/or result fields) available within that back-end system. Such an association creates a dependency between the configuration data (e.g., stored in a file) representing a particular configuration of a pattern (e.g., a pattern-based UI application) and the back-end system. The configuration data (and in some implementations, the configuration application used to generate the configuration data, and the pattern application that uses the configuration data) assumes a particular state of the back-end system. As the back-end system changes over time, the configuration data might no longer match the entities available within that back-end system. To determine compatibility with a back-end system, a system loading a pattern application at run time can attempt to determine whether the state of the back-end system has changed since the configuration for that pattern application was generated.

In one example, the pattern component does this by comparing the version identification (ID) of the entities used in the configuration data with the version ID of those entities in the back-end system. In one example, the pattern component uses a service to make this comparison, which is triggered by the pattern component. The service can be reused across different pattern components. This version comparison can be performed when the application is first launched or when the pattern component attempts to access each entity, for example, to perform data binding of that specific entity. If there is a difference in version IDs between the configuration data and the back-end system, the pattern component recognizes that there has been a change to the back-end system. A version ID can include, for example, a timestamp that changes when the entities in the back-end system change. In another example, the back-end system can provide a list of changes to the pattern component, and the pattern component can determine, through a comparison with the configuration data, whether any changes are applicable for a particular pattern application (e.g., whether any changed entities are used in the configuration).

In some implementations, the granularity of the version ID can vary to fit the needs of the pattern component. Using the model 665 in FIG. 6 as an example, a version ID may be assigned only to customer query 670. In that case, when the version ID of customer query 670 changes, the change can be related to a change in the customer query input structure 675, the customer result structure 680, or both. A change can include, for example, removal of a field (e.g., removal of the "City" field from the customer query input structure 675 and/or the customer result structure 680), the addition of a new field to either structure, and/or a change to the field (e.g., changing the maximum length of a string field, or changing a field type from, e.g., a string to a Boolean). In another example, a version ID is assigned to the customer query input structure 675 and the customer result structure 680, as well as the customer query 670. Using this granularity, the pattern component can advantageously differentiate between changes to the customer query input structure 675 and the customer result structure 680. To detect changes, the pattern component can simply perform a brute force comparison of all the entities used in the configuration data to find version differences.

Where there is a hierarchical relation between entities, the pattern component can advantageously perform a hierarchical comparison, avoiding comparison of the version IDs of children entities where a parent entity's version ID for the configuration data and back-end are identical. For example, starting with the back-end system itself, if the version ID of the back-end system is the same as in the configuration data, then the two are fully compatible and there is no need to perform any more comparisons. If the version IDs are different, the pattern component can proceed hierarchically to the children nodes of the back-end system to see which of those have changed. Using model 665, for example, the pattern component might proceed hierarchically comparing version IDs, eventually arriving at the entity customer query 670. If the customer query 670 version ID is the same as the version ID for that entity in the configuration data, then the two entities are compatible and there is no need to perform any more comparisons of the children entities (e.g., the customer query input structure 675 and the customer result structure 680). If the customer query 670 version ID is not the same, the pattern component can compare the version IDs for the customer query input structure 675 and the customer result structure 680. The pattern component can thus determine whether a change occurred in the customer query input structure 675, the customer result structure 680, or both.

If a pattern component detects that a change to a back-end system has occurred, the pattern component can address the change by modifying the configuration data from a configuration file depending on the type of change. As described below, the modifications can include ignoring some of the configuration data, adding an entity not included in the configuration data, and/or changing an entity in the configuration data (e.g., using a different control for a different data type). The modification of the configuration data can be temporary. For example, the modifying of configuration data can be the configuration data that is read from a configuration file and stored in a memory location or buffer. In this implementation, the configuration data included in the configuration file is not changed from its original state. In other implementations, as described below, the modifications to the configuration data can be persisted by changing the configuration file accordingly.

One type of change is a deleted entity (e.g., the field labeled "Street" is deleted from the customer result structure 680). In one implementation, if an entity is deleted from a back-end system, the pattern component attempts to handle the missing entity without crashing. For example, if a field is deleted from the back-end system, the pattern component can override the configuration data and ignores that field, simply not displaying the field, not allowing searches or other functions or actions to be done on the field, etc. For example, if the field labeled "Street" is deleted from the customer result structure 680 in a back-end system, and the configuration data for a pattern application specifies that all the fields in that structure are to be displayed, the configuration data can be modified to include a display with a table with columns corresponding to the remaining fields in the structure (e.g., Number, Name, City, First Name, and Zip Code), so that the display ignores (e.g., does not include) a column corresponding to the deleted field "Street", even though there was a reference to that field in the original configuration data.

Another type of change is an added entity (e.g., a new field labeled "Country" is added to the customer result structure 680). In one implementation, if an entity is added to a back-end system, the pattern component can simply ignore it. For example, if a new field labeled "Country" is added to the customer result structure 680, the display of that structure in an application can include a table with columns corresponding to each of the fields that are listed in the configuration data (e.g., Number, Name, City, First Name, Street, and Zip Code), and ignore (e.g., not display) a new column corresponding to the added field "Country" that would be included in the result data sent from the back-end system.

Another type of change is a modification to an entity (e.g., changing the maximum length of a string field, or changing a field type from, e.g., a string to a Boolean). If an entity in a back-end system is modified, the pattern component can make appropriate changes to the configuration so that the pattern application executes correctly. For example, assume that objects whose type is string are usually shown in a text field, and that objects whose type is Boolean are usually shown as a checkbox. If a field is modified so that its data type is changed from string to Boolean, the pattern component can change the type of control used to show a column associated with that modified field from a text field to a checkbox. In one example, the changes are incorporated by changing the configuration data.

In some examples, the back-end might rename one of its core access methods, like the read function to retrieve. This can cause the need to change the pattern component. In general though, there exists a kind of contract between the users of an API and the API provider. For such a contract, some standards do exist. One example contract with the back-end systems is that a back-end is allowed to do changes to their API, as long as the back-end provides to their users a smooth migration path. API changes are of syntactical, e.g. renaming a method, or semantical kind. An example of a semantical change is that now the function BeforeSave needs to be called before it is allowed to call the function save. (Both functions did exist before.)

In some examples, the above techniques can also include logic to handle special circumstances. For example, the back-end entities can have an "importance" flag (or critical flag, etc.) associated with them. Such a flag could be used in deciding how to react appropriately to changes in a back-end system. For example, if an entity is added to a back-end system and the entity has the flag set to indicate that the entity is important, the pattern component could automatically display the entity (using default settings for the type of the entity), even though that added entity may not be included in the configuration data for a pattern application. If an entity is deleted from a back-end system and the entity had the flag set (prior to being deleted), an application whose configuration data references that entity could halt (i.e., the entity is presumably critical to the application and so the application should not continue without it). Such decision logic can be used to enable extensibility of a pattern application without modifying the configuration data.

In some examples, patterns divide the configuration data into different categories. One category is the data that is coming from the application development tool. Another category is the data that is being created/modified by the pattern components at runtime. The latter one can be referred to as transient changes, as they will not be persisted. The lifetime of this kind of configuration data (transient changes) is less than or equal to the lifetime of the application session. Transient changes using, for example, the transient layer of the Web Dynpro runtime repository by SAP is one way to address the actions described above.

In other examples, there exist scenarios where a certain backend itself is not available e.g. because it crashed, or is being upgraded to a newer version. A pattern component can also react on this type of change. Having the information about which back-ends host the same kind of business logic, the pattern component can ignore the configuration entry addressing the specific backend and redirect the call to another backend. Usually this kind of job is done by the clustering mechanism, where systems that can perform the same tasks are bundled in a cluster. If one of those systems is under heavy load, is down, or is for another reason not able to process a request, the cluster sends the request to another system. However pattern components can also perform this task.

In addition to the actions above, in some implementations, the pattern component can also change the configuration file itself that holds the configuration data and/or notify an appropriate person of the detected version difference(s). For example, for each detected difference in a back-end system, an end-user, an application developer, an administrator, a backend logic developer, and/or a pattern developer can be notified. This notification can occur, for example, through the use of email. The email can provide an option to the recipient (especially to the application developer) to simply process the differences as described above, but make no changes to the configuration file, or alternatively, to modify the configuration file, in accordance with the techniques described above, to match the current state of the back-end system. This may be useful, for example, because a developer may not want to automatically update a configuration in the scenario where both a back-end system and a pattern component are upgraded but the upgraded back-end system is installed before the upgraded pattern component. In this scenario, the (old) pattern component may detect changes to the back-end system and make corresponding changes to the configuration, but the changed configuration data should not be saved to the original configuration file, because in some implementations the original configuration file is upgraded automatically when the upgraded pattern component is finally installed.

As described above, a configuration is designed for a certain version of a back-end system. Similarly, in some implementations, a configuration application is also designed for a certain version of a back-end system. For example, a configuration application for an OIP can provide a list of fields that an application developer can make available for executing queries (e.g., in a drop-down box). If the fields in the back-end system change, the configuration application should make corresponding changes to the list of available fields in order to match the current state of the back-end system. Thus, in some implementations, the configuration application can have the same issues described above, and the same techniques can be used to detect and handle changes to a back-end system (e.g., assign version numbers to back-end entities and compare those version numbers to version numbers stored in the configuration application).

The above-described techniques can be implemented in digital electronic circuitry, or in computer hardware, firmware, software, or in combinations of them. The implementation can be as a computer program product, i.e., a computer program tangibly embodied in a machine-readable storage device or in a propagated signal, for execution by, or to control the operation of, data processing apparatus, e.g., a programmable processor, a computer, or multiple computers. The machine-readable storage device includes hardware. A computer program can be written in any form of programming language, including compiled or interpreted languages, and it can be deployed in any form, including as a stand-alone program or as a module, component, subroutine, or other unit Suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, the operations of the invention can be performed in a different order and still achieve desirable results. In certain implementations, multitasking and parallel processing may be preferable. As another example, although the use of UI patterns has been described in connection with business objects and business data, patterns can be used with other types of objects and with data that is not business-related.

Patterns can also be developed using different development processes in different development environments, and executed in different run-time systems. For example, patterns can be developed using an integrated development environment (IDE) that incorporates tools for building, testing, deploying, and maintaining applications (e.g., configuration applications and pattern components). Such tools can include visual development tools, templates (e.g., code templates), and class libraries. A class library can include base classes that provide basic functionality (e.g., input/output, string manipulation, and network communication), as well as specialized classes that provide enhanced functionality (e.g., classes for building and using graphical user interfaces on clients, and for offloading application functionality onto smart clients). Where an IDE supports multiple languages, class libraries can provide a consistent development interface across those languages.

In addition, some IDEs also provide services and functionality that can be used to reduce the amount of code that needs to be written manually. Such functionality can include, for example, the ability to declare and bind to data types, and the ability to bind application elements such as controls and data structures.

IDEs can also provide code generation capabilities—for example, the ability to automatically generate plumbing code (e.g., code for drawing windows or accessing Web services), or the ability to automatically generate run-time code (e.g., by using code generators, compilers, or both). The automatic generation of run-time code allows programs to be targeted to multiple platforms. For example, a code generator can be used to automatically generate run-time code for one or more specific platforms based on the program code produced by a developer. Alternatively, the developer code can be compiled for a run-time system, which can be hosted in multiple environments (e.g., servers, clients, or a combination of servers and clients).

Some IDEs also provide the ability to create metadata that specifies descriptive information about an application, and that can be used by a run-time system to provide services to the application. Metadata can be explicitly declared by a developer, generated in the process of generating run-time code, or both.

Examples of IDEs that can be used to develop patterns include IDEs that are built using the open Eclipse Platform supported by the Eclipse Foundation (e.g., the Web Dynpro IDE developed by SAP, or the WebSphere Studio IDE developed by IBM Corp. of Armonk, N.Y.), as well as proprietary IDEs (e.g., the Visual Studio .NET IDE developed by Microsoft Corp. of Redmond, Wash.).

The overall process of developing a pattern (including, e.g., developing a configuration application and a pattern component) can include a design time aspect and a run-time aspect. The design time aspect can involve use of the IDE to write code and to declare attributes, bindings, and other metadata. The code and the metadata can then be used to generate run-time code to be executed in a run-time system. Some development environments can be coupled to a corresponding run-time system, which allows programs developed in such development environments to take advantage of services offered by the corresponding run-time systems. For example, in the Web Dynpro environment discussed in conjunction with FIG. 5, applications can take advantage of services such as input help and validation offered by the Web Dynpro runtime, which frees developers from having to code such functionality manually into their programs.

Run-time systems provide a code execution environment that generally includes core services (e.g., memory, process, and session management), as well as enhanced services (e.g., input help and validation). In addition to the Web Dynpro runtime, other examples of run-time systems include virtual machines (e.g., the Java Virtual Machine), and the Common Language Runtime (a run-time system developed by Microsoft Corp.) As specified above, run-time systems can be hosted in multiple environments, including servers and clients. Servers generally provide a core operating environment for applications (e.g., by providing a run-time system in which the applications can execute). An example of a server is a J2EE-compliant server, such as the Web Application Server from SAP or the WebSphere Application Server from IBM Corp.

What is claimed is:

1. A machine-readable storage device comprising a computer program product, the computer program product comprising instructions which, when executed on data processing apparatus, cause the data processing apparatus to:

receive configuration data for a pattern, the pattern including a predefined arrangement of user interface elements and specifying predefined actions that can be performed using the user interface elements, the configuration data comprising a first version identification and specifying an association between one of the user interface elements and an entity defined in a back-end system;

receive selection of the one of user interface elements from a user;

generate, based on the selection, an application program by using the pattern, the configuration data being used to associate the application with the entity in the back-end system, wherein the application program is configured to perform a predefined action corresponding to the selected user interface element;

determine whether the back-end system is available for access by the application program;

retrieve, based on an access request by the application program, a second version identification from the back-end system when the back-end system is determined to be available, wherein the first and second version identification correspond to a version of the entity and the access request is redirected to another back-end system when the back-end system is not available;

compare the first version identification and the second version identification, the comparison being performed when the application program accesses the entity in the back-end system;

generate a notification indicating that the first version identification does not match the second version identification, the notification including a selectable option, wherein the generated application program continues to perform the predefined action when the comparison indicates that the first version identification does not match the second version identification;

receive an authorization in response to selection of the selectable option by a user; and modify, in response to the authorization, the configuration data corresponding to the application program, based on information stored in the back-end system, the modification including different types of modifications, wherein a type of the modification of the configuration data is determined based on the stored information.

2. The machine-readable storage device of claim 1, wherein the first version identification and the second version identification each correspond to a version of the back-end system.

3. The machine-readable storage device of claim 1, wherein the application program accesses the entity in the back-end system when the application program is first launched.

4. The machine-readable storage device of claim 1, wherein the instructions to modify the configuration data comprise instructions to disregard an added entity in the back-end system.

5. The machine-readable storage device of claim 4, wherein the added entity comprises an added field.

6. The machine-readable storage device of claim 1, wherein the instructions to modify the configuration data comprise instructions to disregard a deleted entity not included in the back-end system but referenced in the configuration data.

7. The machine-readable storage device of claim 6, wherein the deleted entity comprises a deleted field.

8. The machine-readable storage device of claim 1, wherein the instructions to modify the configuration data comprise instructions to disable functionality associated with a deleted entity not included in the back-end system but referenced in the configuration data.

9. The machine-readable storage device of claim 8, wherein the functionality comprises displaying data associated with the deleted entity.

10. The machine-readable storage device of claim 8, wherein the functionality comprises invoking one of the predefined actions in association with the deleted entity.

11. The machine-readable storage device of claim 8, wherein the instructions cause the data processing apparatus to display a notification message related to the deleted entity.

12. The machine-readable storage device of claim 1, wherein the instructions to modify the configuration data comprise instructions to modify one or more of the user interface elements that are associated with a modified entity in the back-end system.

13. The machine-readable storage device of claim 12, wherein the information about the back-end system comprises a data type associated with the modified entity.

14. The machine-readable storage device of claim 1, wherein the instructions to modify the configuration data comprise instructions configured to receive input from a user to specify whether to save the configuration data.

15. The machine-readable storage device of claim 1, wherein the information about the back-end system comprises a flag.

16. The machine-readable storage device of claim 15, wherein the instructions to modify the configuration data comprise instructions to display an added entity in the back-end system that is associated with the flag.

17. The machine-readable storage device of claim 15, wherein the instructions to modify the configuration data comprise instructions to highlight a modified entity in the back-end system that is associated with the flag.

18. The machine-readable storage device of claim 15, wherein the instructions to modify the configuration data comprise instructions to terminate execution of an application when the flag is associated with a deleted entity not included in the back-end system but referenced in the configuration data.

19. The machine-readable storage device of claim 1, wherein the instructions to modify the configuration data comprise instructions to persist the modified configuration data in a configuration file associated with the configuration file.

20. The machine-readable storage device of claim 1, wherein the pattern is a first pattern and wherein the instructions further cause the data processing apparatus to:
establish an integrated development environment for developing applications based on a programming model;
establish a plurality of patterns including the first pattern, each pattern including a predefined arrangement of user interface elements and specifying predefined actions that can be performed using the user interface elements, and each pattern having an associated configuration application and an associated pattern component, wherein each configuration application and each pattern component is developed using the integrated development environment and conforms to the programming model; and
develop the application by executing the configuration application for the first pattern to produce the configuration data for the first pattern, and further specifying customization data for the user interface elements.

21. The machine-readable storage device of claim 20, wherein the instructions further cause the data processing apparatus to establish one or more run-time services to be used by applications developed according to the programming model, and wherein the pattern component invokes one or more of the run-time services during execution of the application.

22. The machine-readable storage device of claim 1, wherein the selectable option includes:
a first option, which when selected by the user, causes the modification of the configuration data based on the information stored in the back-end system; and
a second option, which when selected by the user, prevents the modification of the configuration data, and the generated application program continues to perform the predefined action using unmodified configuration data.

23. A method being implemented by a computer and comprising:
receiving, by a processor of the computer, configuration data for a pattern, the pattern including a predefined arrangement of user interface elements and specifying predefined actions that can be performed using the user interface elements, the configuration data comprising a first version identification and specifying an association between one of the user interface elements and an entity defined in a hardware back-end system;
receiving selection of one of the user interface elements from a user;
generating, based on the selection, an application program by using the pattern, the configuration data being used to associate the application with the entity in the back-end system, wherein the application program is configured to perform a predefined action corresponding to the selected user interface element;
determining whether the back-end system is available for access by the application program;
retrieving, based on an access request by the application program, a second version identification from the back-end system when the back-end system is determined to be available, wherein the first and second version identification correspond to a version of the entity and the access request is redirected to another back-end system when the back-end system is not available;
comparing the first version identification and the second version identification, the comparison being performed when the application program accesses the entity in the back-end system;

generating a notification indicating that the first version identification does not match the second version identification, the notification including a selectable option, wherein the generated application program continues to perform the predefined action when the comparison indicates that the first version identification does not match the second version identification;

receiving an authorization in response to selection of the selectable option by a user; and modifying, in response to the authorization, the configuration data corresponding to the application program, based on information stored in the back-end system, the modification including different types of modifications, wherein a type of the modification of the configuration data is determined based on the stored information.

24. The of claim 23, wherein the selectable option includes:

a first option, which when selected by the user, causes the modification of the configuration data based on the information stored in the back-end system; and a second option, which when selected by the user, prevents the modification of the configuration data, and the generated application program continues to perform the predefined action using unmodified configuration data.

25. A memory device comprising a pattern component causing data processing apparatus to:

receive configuration data for a pattern, the pattern including a predefined arrangement of user interface elements and specifying predefined actions that can be performed using the user interface elements, the configuration data comprising a first version identification and specifying an association between one of the user interface elements and an entity defined in a back-end system;

receive selection of the one of user interface elements from a user;

generate, based on the selection, an application program by using the pattern, the configuration data being used to associate the application with the entity in the back-end system, wherein the application program is configured to perform a predefined action corresponding to the selected user interface element;

determine whether the back-end system is available for access by the application program;

retrieve, based on an access request by the application program, a second version identification from the back-end system when the back-end system is determined to be available, wherein the first and second version identification correspond to a version of the entity and the access request is redirected to another back-end system when the back-end system is not available;

compare the first version identification and the second version identification, the comparison being performed when the application program accesses the entity in the back-end system;

generate a notification indicating that the first version identification does not match the second version identification, the notification including a selectable option, wherein the generated application program continues to perform the predefined action when the comparison indicates that the first version identification does not match the second version identification;

receive an authorization in response to selection of the selectable option by a user; and modify, in response to the authorization, the configuration data corresponding to the application program, based on information stored in the back-end system, the modification including different types of modifications, wherein a type of the modification of the configuration data is determined based on the stored information.

26. The memory device of claim 25, wherein the selectable option includes:

a first option, which when selected by the user, causes the modification of the configuration data based on the information stored in the back-end system; and a second option, which when selected by the user, prevents the modification of the configuration data, and the generated application program continues to perform the predefined action using unmodified configuration data.

* * * * *

UNITED STATES PATENT AND TRADEMARK OFFICE
CERTIFICATE OF CORRECTION

PATENT NO. : 7,606,820 B2
APPLICATION NO. : 10/843009
DATED : October 20, 2009
INVENTOR(S) : Stienhans et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1070 days.

Signed and Sealed this

Twelfth Day of October, 2010

David J. Kappos
*Director of the United States Patent and Trademark Office*